United States Patent
Botti

(10) Patent No.: US 9,925,486 B1
(45) Date of Patent: Mar. 27, 2018

(54) FILTER CHANGER SYSTEM AND RELATED METHODS

(71) Applicant: Rick Botti, Cave Creek, AZ (US)

(72) Inventor: Rick Botti, Cave Creek, AZ (US)

(*) Notice: Subject to any disclaimer, the term of this patent is extended or adjusted under 35 U.S.C. 154(b) by 68 days.

(21) Appl. No.: 15/063,413

(22) Filed: Mar. 7, 2016

Related U.S. Application Data

(60) Provisional application No. 62/177,051, filed on Mar. 6, 2015.

(51) Int. Cl.
*B01D 46/00* (2006.01)
*B01D 46/42* (2006.01)
*B66F 11/00* (2006.01)

(52) U.S. Cl.
CPC ..... *B01D 46/0005* (2013.01); *B01D 46/4227* (2013.01); *B66F 11/00* (2013.01)

(58) Field of Classification Search
CPC .......... B66F 9/142; B66F 9/146; B66F 9/182; B66F 9/18–9/195; B66F 11/00–11/048; B01D 46/00; B01D 46/0005–46/0009
USPC ..... 294/27.1–34, 65.5, 190, 81.53, 192–211; 414/1–8, 10–12, 18–20; 248/448–449, 248/670, 689–693; 40/113; 55/490–519
See application file for complete search history.

(56) References Cited

U.S. PATENT DOCUMENTS

| | | |
|---|---|---|
| 8,075,031 B2 | 12/2011 | Walker, Jr. |
| 2009/0199526 A1* | 8/2009 | Wallace ............. B01D 46/0004 55/493 |
| 2012/0305094 A1 | 12/2012 | Wallace |

* cited by examiner

*Primary Examiner* — T. Bennett McKenzie
(74) *Attorney, Agent, or Firm* — IPTechLaw

(57) ABSTRACT

Implementations of a filter holder may include: a mounting bracket having two or more T-shaped brackets slidably coupled with each other each with a first part and a second part, the first part being substantially perpendicular to the second part. A disc may be included. Two or more clamps, each coupled to the second part of each of the two or more T-shaped brackets may be included which couple to a filter. The disc may be slidably coupled to the first part of each of the two or more T-shaped brackets. The slidable coupling of the two or more T-shaped brackets may allow the T-shaped brackets to accommodate a dimension of two or more differently sized filters.

8 Claims, 7 Drawing Sheets

FILTER CHANGER SYSTEM AND RELATED METHODS

CROSS REFERENCE TO RELATED APPLICATIONS

This document claims the benefit of the filing date of U.S. Provisional Patent Application 62/177,051, entitled "Filter Changer Tool" to Rick Botti which was filed on Mar. 6, 2015, the disclosure of which is hereby incorporated entirely herein by reference.

BACKGROUND

1. Technical Field

Aspects of this document relate generally to systems and methods used to change filters.

2. Background

Conventionally, filters are used to remove material from a fluid stream. Various filters have been devised for use with particular fluid types. Air filters are used for heating and air condition systems that are designed to entrap dust and other particles while air is passing through them.

SUMMARY

Implementations of a filter holder may include: a mounting bracket having two or more T-shaped brackets slidably coupled with each other. Each T-shaped bracket may have a first part and a second part, the first part being substantially perpendicular to the second part. A disc having one or more holes therethrough. The one or more holes configured to receive one or more connectors coupled with the two or more T-shaped brackets. Two or more clamps, each coupled to the second part of each of the two or more T-shaped brackets. The two or more clamps configured to couple to a filter. The disc is slidably coupled to the first part of each of the two or more T-shaped brackets. The second part of the one or more T-shaped brackets are substantially parallel with each other. The slidable coupling of the two or more T-shaped brackets allows the T-shaped brackets to accommodate a dimension of two or more differently sized filters.

Implementations of filter holders may include one, all, or any of the following:

The two or more T-shaped brackets may be made of wire.

The first part of the two or more T-shaped brackets may be formed from a wire loop.

The disc may be a ring having a central hole therethrough.

The disc may be magnetizable.

The disc may be a magnet.

The one or more connectors coupled with the two or more T-shaped brackets may be two fasteners comprising two screws with two washers wherein the disc and the first part of the T-shaped brackets may be slidably positioned in the space between the screws and washers.

A magnet may couple to the disc.

Implementations of systems for changing a filter may include: a filter holder having two or more T-shaped brackets each having a first part and a second part. The T-shaped brackets may be arranged in slidable relation with each other and a disc may be slidably coupled to the T-shaped brackets. A pole may be configured to extend to a desired length. The pole may have a first end and a second end, and a magnet coupled to the second end of the pole. Two or more clamps may couple the filter holder to a filter. Each of the two or more clamps may be coupled to the second part of each of the two or more T-shaped brackets, respectively. One or more fasteners may be coupled to a filter grate of an air duct configured to keep the filter grate closed during normal operation. The clamps, the filter holder, and the filter may be configured to be positioned within an opening of the air duct adjacent to the filter grate during normal operation. The magnet on the second end of the pole may be configured to engage with the disc on the filter holder to enable a user to remove the filter from the air duct.

Implementations of systems for changing a filter may include one, all, or any of the following:

A stand may be removably attached to the first end of the pole.

The stand may be a tripod.

The pole may be configured to reach a floor and rest on the stand.

The one or more fasteners may be magnets.

Implementations of filter holders may be used for changing filters, the method may include one, all, or any of the following: turning on a fan associated with an air handling system to create air movement through an air filter coupled in an opening of an air duct adjacent to a filter grill to hold the filter in the opening when the filter grill is opened. A magnet of a filter pole may be engaged to an outer frame of the filter grill. The filter grill may be pulled down using the filter pole to open the filter grill by disengaging one or more magnets on one of the filter grill and the opening. The filter pole may be placed directly under the filter and may engage the magnet on the filter pole with a disc on the filter holder. The fan may be turned off. The air filter may be removed from the air duct using the filter pole. The air filter may be decoupled from the air duct using the filter pole. The air filter may be decoupled from the filter holder. A replacement air filter may be coupled with the filter holder. The magnet on the filter pole may be engaged with the disc of the filter holder and the replacement filter may be placed into the opening of the air duct using the filter pole. The fan may be turned on. The magnet on the second end of the filter pole may be disengaged from the disc on the filter holder. The magnet on the filter pole may be engaged with the outer frame of the filter grill. The one or more magnets may be recoupled to one of the filter grill and the opening to close the filter grill over the opening of the air duct. The magnet on the filter pole may disengaged from the filter.

Implementations of methods for changing a filter may include one, all, or any of the following:

One or more magnets may be coupled to the filter grill to magnetically couple to the opening of the air duct.

The filter holder may be initially coupled to an air filter by sliding the two or more T-shaped brackets included in the filter holder to accommodate a dimension of the air filter. Coupling the filter holder to the air filter using two or more clamps. Each of the two or more clamps may be coupled to the second part of each of the two or more T-shaped brackets.

The disc may include one of a magnetizable material and a magnet.

The pole may have a first end and a second end, the first end having a stand and the second end having a magnet coupled thereto.

The stand may be a tripod.

The pole may be extended to reach the floor and the pole may rest on the stand to hold the filter in place in the opening of the air duct.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended filter holders, systems for changing a filter, and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such filter holders, systems for changing a filter and implementing components and methods, consistent with the intended operation and methods.

Figure 1:
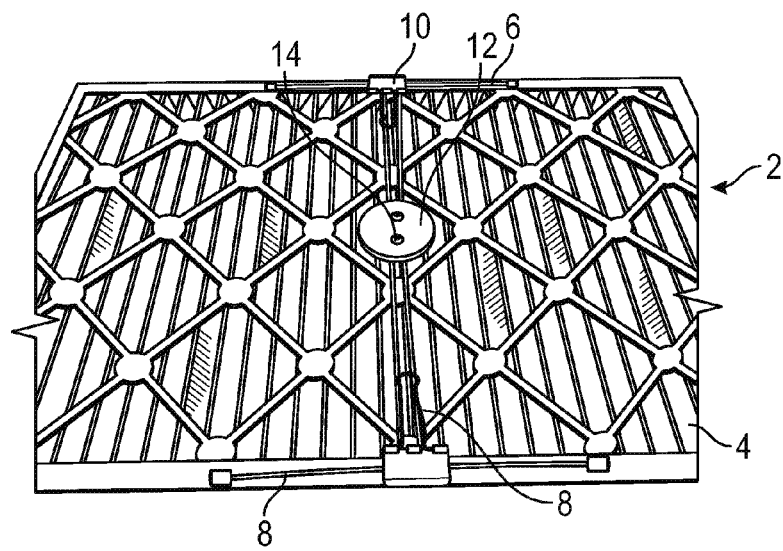
FIG. 1 is an implementation of a filter holder coupled to a filter.

In FIG. 1, an implementation of a filter holder 2 coupled to a filter 4 is illustrated. The filter holder 2 may have a mounting bracket 6 having two or more T-shaped brackets 8 each having a first part and a second part. The first part is substantially perpendicular to the second part. In this implementation, the mounting bracket 6 is in a fully extended position. The filter holder 2 may be coupled to the filter 4 by clamps 10. The clamps 10 may be coupled to the second part of the T-shaped brackets 8. The clamps 10 may be integral to the filter holder 2 or may be detachable. The clamps 10 may be capable of rotating around the second part of the T-shaped brackets 8 or may remain stationary. In various implementations, the clamps 10 may be magnetic and may be capable of holding the filter holder 2 in the opening of a duct through the magnetic force alone.

The T-shaped brackets 8 may be made of wire. The first part of the T-shaped brackets 8 may be formed from a wire loop that has an opening in a side the loop. This wire loop may take the form of a very long rectangle with a curved end and an opening opposing the curved end. The two or more T-shaped brackets 8 may be coupled together by a disc 12. The disc 12 may have one or more holes 14 configured to receive one or more sliding connectors coupled with the two or more T-shaped brackets 8. In some implementations, the disc 12 may include a central hole therethrough to form a ring. In particular implementations, the disc 12 may be magnetizable. In other implementations, the disc 12 may include or may be a magnet. The slidable coupling of the two or more T-shaped brackets 8 may allow the T-shaped brackets 8 to be slid relative to each other to size the filter holder to accommodate two or more dimensions of differently sized filters 4.

Figure 2A:
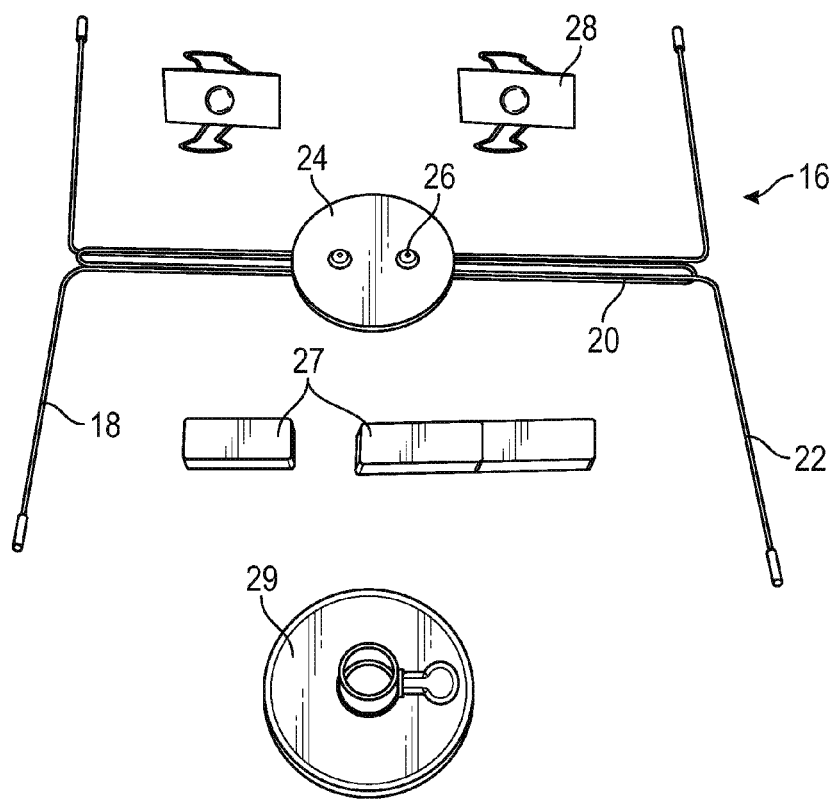
FIG. 2A is a front view of an implementation of a filter holder.

Referring to FIG. 2A, a front view of an implementation of a filter holder 16 is illustrated. The T-shaped brackets 18 may have a first part 20 and a second part 22, the first part being substantially perpendicular to the second part 22. The T-shaped brackets 18 may be coupled together by the disc 24 on the first part 20 of each of the T-shaped brackets 18. The first part 20 of each of the T-shaped brackets 18 may overlap/correspond with each other and the second part 22 of each of the T-shaped brackets 18 may be substantially parallel to each other. The disc 24 and T-shaped brackets 18 may be slidably coupled together by connectors 26. By non-limiting example, the connectors 26 may be two screws and two washers, though a single connector, or more than two connectors may be used in various implementations. The disc 24 and the first part 20 of the T-shaped brackets 18 may be slidably positioned in the space between the screws and the washers. The disc 24 may be a magnet. The magnet may be similar to the magnet 29 illustrated in FIG. 2A. By non-limiting example, the filter holder 16 may be coupled to a filter by binder clips 28. The binder clips 28 may be positioned on the second part of the T-shaped brackets 18. The handles of the binder clips 28 may be folded to be touching the first part of the T-shaped brackets 18. Also shown are magnets 27 that may be used coupled to a filter grate to an opening of an air duct (See FIG. 3)

Figure 2B:
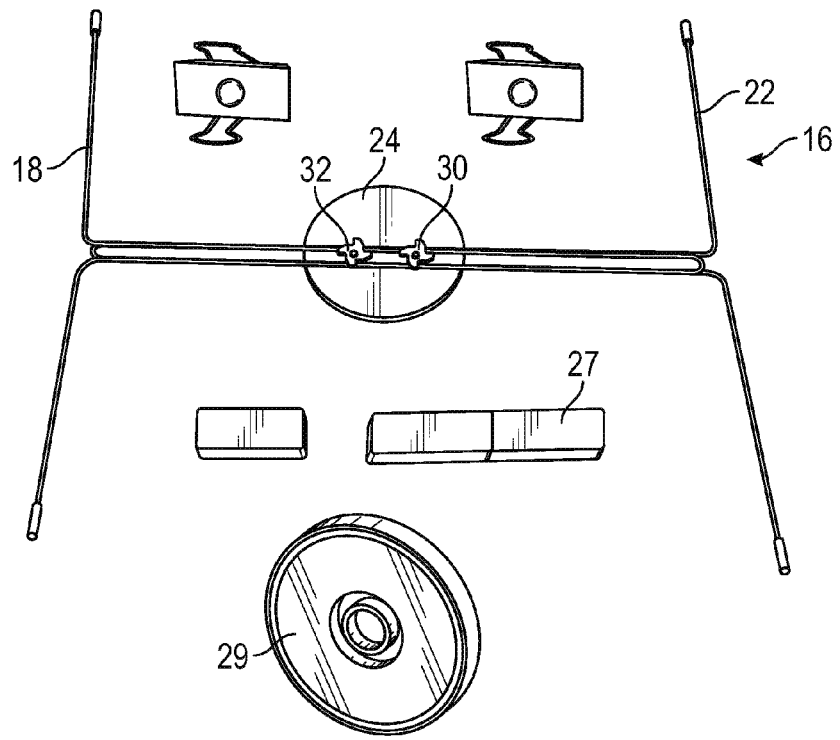
FIG. 2B is a back view of an implementation of a filter holder.

Referring to FIG. 2B, a back view of an implementation of a filter holder 16 is illustrated. In this view, the back of the connectors 26 on the disc 24 are illustrated. The washer 30 and the shaft of the screw 32 can be seen. The screws 32 may be positioned through the holes of the disc 24 with the head of the screw 32 positioned on the opposite side of the disk 24 from the T-shaped brackets 18. The washers 30 may be coupled to the shaft of the screws 32 opposite the heads of the screws 32 with the disc 24 and T-shaped brackets 18 in between. The washer 30 may be in contact with the T-shaped brackets 18 and may be opposite the disc 24. In this implementation, the brackets are in the smallest position for the size of the brackets. The T-shaped brackets 18 may slide apart from each other to fit a larger filter, the second parts 22 then being further away from each other.

Figure 3:
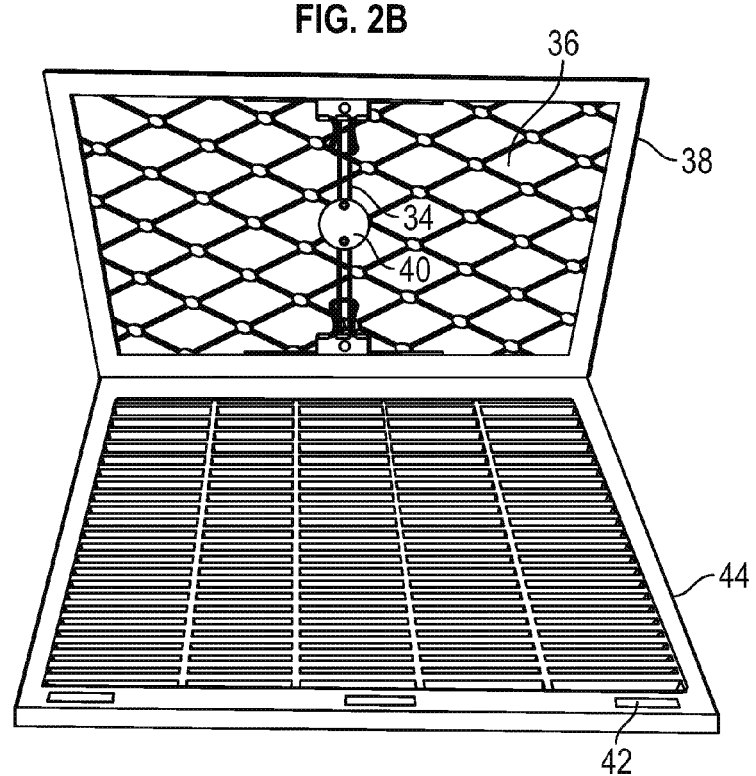
FIG. 3 is a view of an implementation of a filter holder coupled to a filter positioned in an air duct.

Referring to FIG. 3, an implementation of a filter holder 34 coupled to a filter 36 positioned inside an opening of an air duct 38 is illustrated. The disc may be a ring 40. One or more magnets 42 are coupled to the filter grate 44. The one or more magnets 42 may be used to couple the filter grate 44 to an opening of an air duct 38 keeping the filter grate closed during normal operation of an air handling system.

Figure 4A:
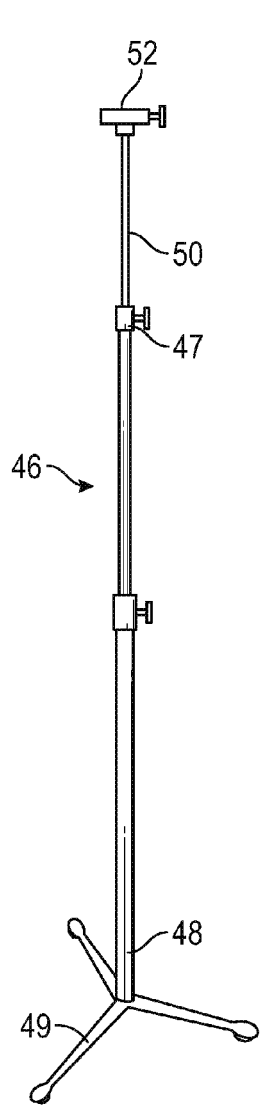
FIG. 4A is an implementation of a pole from an implementation of a system for changing a filter.
Figure 4B:
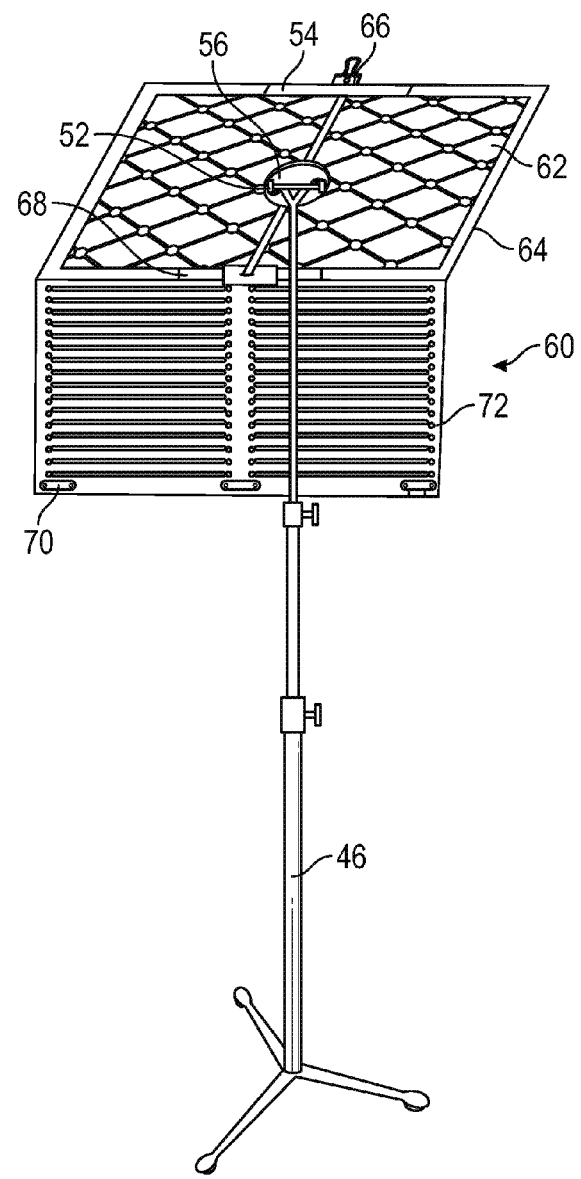
FIG. 4B is an implementation of a system for changing a filter.

Referring to FIG. 4A, a pole 46 for use in an implementation of a system for changing a filter is illustrated. The pole 46 may be configured to extend to a desired length by telescoping pieces 47. The pole 46 may extend to reach a floor. The pole 46 may have a first end 48 and a second end 50. A stand 49 may be removably coupled to the first end of the pole 46. In various implementations, the stand 49 may be a tripod. A magnet 52 may be, in various implementations coupled to the second end 50 of the pole, though in some, a magnetizable material may be coupled at the second end 50. The magnet 52 may be configured to couple to a filter holder 54 (FIG. 4B). More specifically, the magnet 52 coupled to the pole 46 may couple to a disc 56 on a filter holder 54. The pole 46 may be used to hold a filter holder 54 coupled to a filter 62 in place in the opening of the air duct 64 by resting the pole 46 on the stand 49 on a floor while a fan associated with an air handling system is turned on/off.

Referring now to FIG. 4B, an implementation of a system for changing a filter 60 is illustrated. A filter holder 54 may be coupled to a filter 62. The filter 62 may be in place in an opening of an air duct 64. The filter holder 54 may be coupled to the filter 62 by two or more clamps 66. Each of the two or more clamps 66 may be coupled to the second part of each of the two or more T-shaped brackets 68, respectively. The filter holder 54 may include two or more T-shaped brackets 68 each having a first part and a second part. The T-shaped brackets 68 may be arranged in slidable relation with each other and a disc 56 may be slidably coupled to the T-shaped brackets 68. The clamps 66, the filter holder 54 and the filter 62 may be configured to be positioned within an opening of the air duct 64 adjacent to the filter grate 72 during normal operation. Pole 46 is designed to extend to a desired length, which makes it capable of reaching the height of the filter grate 72 and air duct 64 when raised by a user. The pole 46 has a first end and a second end and a magnet 52 is attached to the second end of the pole 46. The magnet 52 on the second end 50 of the pole 46 engages with the disc 56 on the filter holder 54 to enable a user to remove the filter 62 from the opening of the air duct 64. It also may engage with the filter grate 72 itself, and allow the user to open the filter grate 72 using the magnet 52. One or more fasteners 70 may be coupled to a filter grate 72 of an air duct 64. The one or more fasteners 70 may be configured to keep the filter grate closed during normal operation. By non limiting example, the fasteners may be magnets, hook and loop closures, any combination thereof, or any other structure capable of holding the filter grate closed.

An implementation of a system for changing a filter may be used in an implementation of a method for changing a filter. The method may include turning on a fan associated with an air handling system to create air movement through an air filter 62 in an opening of an air duct 64 adjacent to a filter grill 72 to hold the filter 62 in the opening of the air duct 64 when the filter grill 72 is opened. When this is done, suction from the fan holds the air filter 62 in the opening. In other method implementations, the clamps or other structure of the filter holder may be magnetic so that the filter holder can be supported in the opening of the air duct 64 under magnetic force without needing to use the suction from the fan to hold the filter 62 in the opening. A magnet 52 on a filter pole 46 is then engaged to an outer frame of the filter grill 72. The filter grill 72 is then pulled down to open it using the filter pole 46. The filter grill 72 may be opened by disengaging one or more magnets 70 on one of the filter grill 72 and opening of the air duct 64. The filter pole 46 is then placed under the filter 62 and the magnet 52 on the filter pole 46 is engaged with the disc 56 on the filter holder 54. At this point, the fan of the air handling system may be turned off, though, it may not be in various method implementations. The air filter 62 is then removed from the opening of the air duct 64 using the filter pole 46 and the filter holder. The air filter 62 is then decoupled from the filter holder 54 by releasing the clamps, etc. A replacement air filter is then attached to the filter holder 54 using the clamps, etc.

To reinstall the air filter 62, the magnet 52 on the filter pole 46 is engaged with the disc 56 of the filter holder 54, which may be any disclosed in this document. The replacement filter and filter holder 54 is then placed back into the opening on the air duct 64 using the filter pole 46. The fan of the air handling system can then be turned on to create suction to hold the filter holder 54 in place. After disengaging the magnet 52 on the second end of the filter pole 46 from the disc 56 on the filter holder 54, the magnet 52 on the filter pole 46 may be engaged with the outer frame of the filter grill 72. The one or more magnets 70 may be recoupled on one of the filter grill 72 and the opening of the air duct 64 to close the filter grill 72 over the opening of the air duct 64. The magnet 52 on the filter pole 46 may be disengaged from the filter grill 72.

The initial set up used to couple the filter holder 54 to a filter 62 may include coupling the filter holder 54 to an air filter by sliding the two or more T-shaped brackets 68 included in the filter holder 54 to accommodate a dimension of the air filter. A user may couple the filter holder 54 to the air filter using the two or more clamps 66, each of the two or more clamps 66 may be coupled to the second part of each of the two or more T-shaped brackets 68. The clamps may be, by non-limiting example, binder clips, latches, hook and loop fasteners, clips, and the like. The method may also include initially coupling one or more magnets 70 to the filter grill 72 to allow the filter grill to magnetically couple to the opening of the air duct 64.

Figure 5:
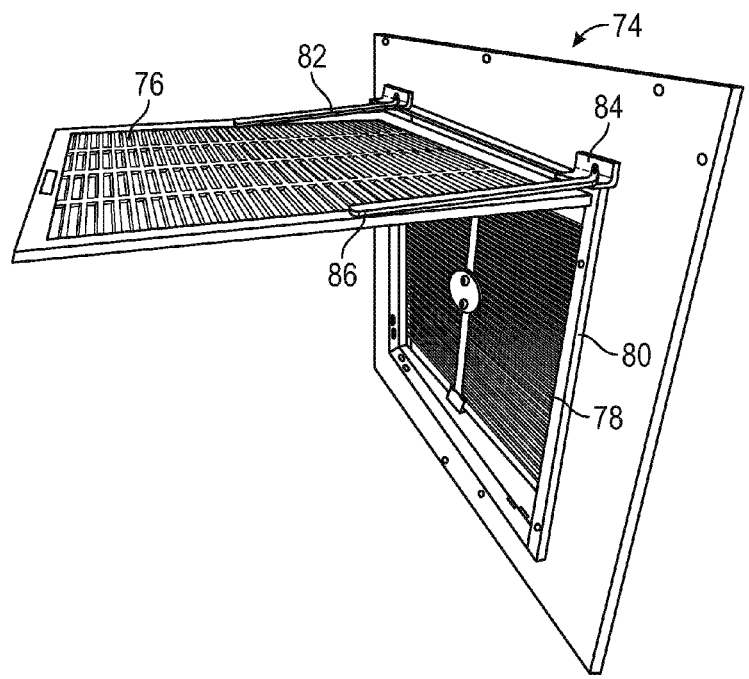
FIG. 5 is side view of an implementation of a filter grate support system.

Referring to FIG. 5, a side view of an implementation of a filter grate support system 74 is illustrated. The filter grate support system 74 may be used to hold a filter grate 76 open while changing an air filter 78 positioned in an opening of an air duct 80 where the air filter 78 is oriented vertically relative to a floor of a building. The system may include two or more arms 82, each having a first end and a second end. The first end of each arm may couple to one or more brackets 84 coupling the arms 82 to a wall or ceiling adjacent the filter grate 76 and opening of the air duct 80. The second end of each arm 82 may couple to one or more adapters 86 configuring the arms to support the filter grate 76 in an open position. By non-limiting example, the adapters 86 may be coupled to the arms 82 by an adhesive, a glue, a tape or any other attaching mechanism, including coupling into ends of the arms 82. By non-limiting example, the adapters 82 may be magnets.

Figure 6:
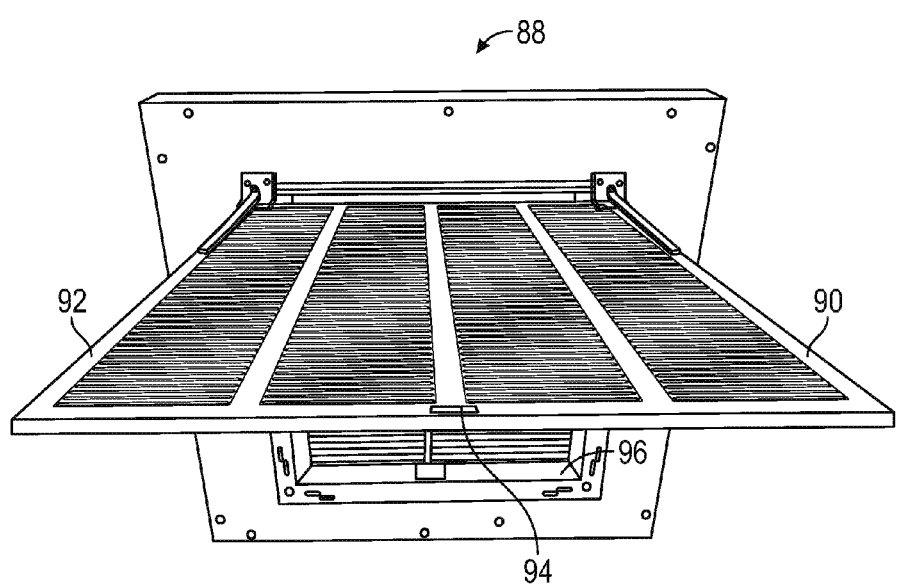
FIG. 6 is a front view of an implementation of a filter grate support system.

Referring to FIG. 6, a front view of an implementation of a filter grate support system 88 in an open position is illustrated. The arms 90 of an implementation of a filter grate support system 88 may support a filter grate 92 in the open position. One or more closures 94 may couple to an end of the filter grate 92 opposite the hinge end of the filter grate 92. They may couple to the outside or inside of the filter grate 92 in various implementations. The closures 94 may be one of a magnet, a hook and loop fastener or any combination thereof. The closures 94 may be used to keep the filter grate 92 and the opening of an air duct 96 coupled in a closed position.

Figure 7:
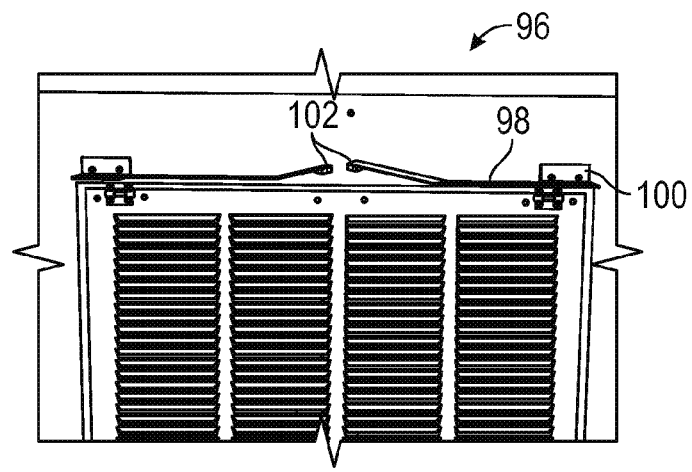
FIG. 7 is a front view of an implementation of a filter grate support system in a closed position.

Referring to FIG. 7, a front view of an implementation of a filter grate support system 96 in a completely closed position is shown. The arms 98 may be in a retracted position when the filter grate support system 96 is not in use. The brackets 100 may allow the arms to rotate about 90 degrees between an open position and closed/retracted position. The arms 98 may be slightly bent upwardly near each of the second ends of the arms 98 where the adapters 102 may be coupled to the arms 98.

Figure 8:
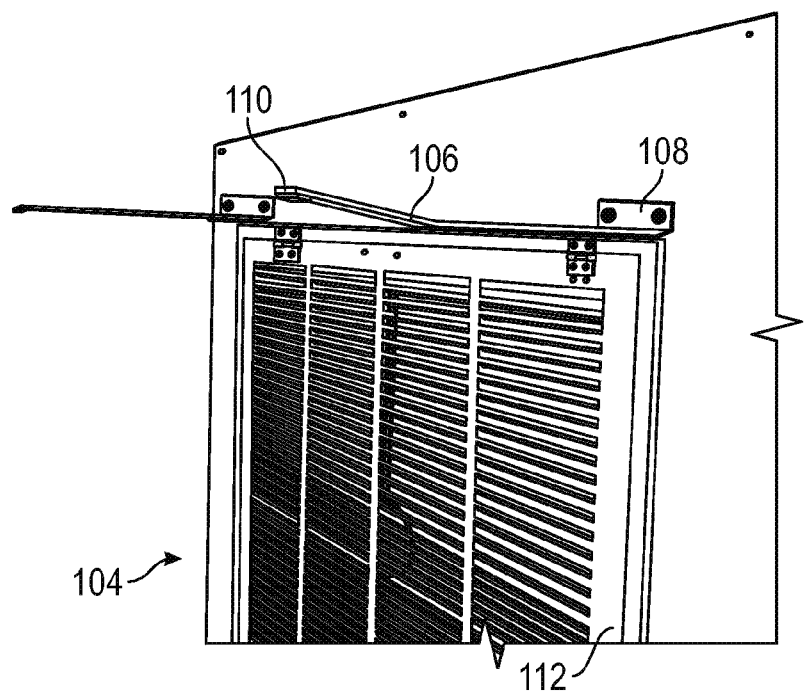
FIG. 8 is a side view of an implementation of a filter grate support system in a partially open position.

Referring to FIG. 8, a side view of an implementation of a filter grate support system 104 in a partially open position is illustrated. Here, the arms 106 are positioned substantially perpendicular to the one or more brackets 108 of the filter grate support system 104. The one or more adapters 110 on each arm 106 may be positioned to couple to the filter grate 112 when the filter grate is in an open position.

Figure 9:
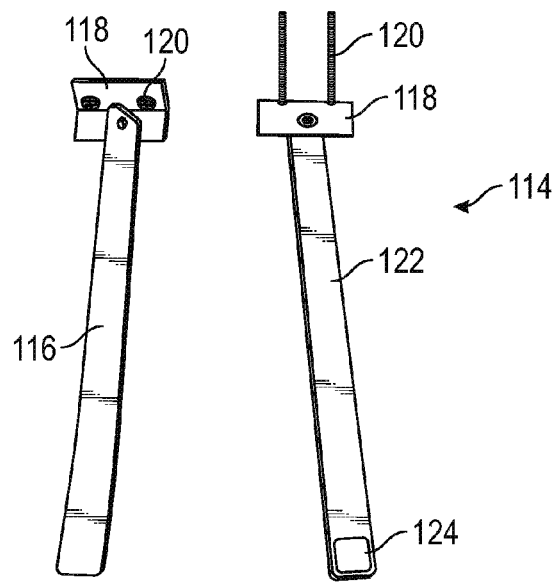
FIG. 9 is a top view of an implementation of one or more arms of an implementation of a filter grate support system.

Referring to FIG. 9, a top view of an implementation of one or more arms 114 of a filter grate system is illustrated. One arm 116 is shown with a top of the arm visible. A bracket 118 for coupling the arm to a wall or ceiling with two or more connectors 120 therethrough is coupled to one end of the arm 116. By non-limiting example, the connectors 120 may be wall screws. A second arm 122 with a bottom of the arm visible is also shown. At one end of the arm 122 a back of the bracket 118 with the two or more connectors 120 therethrough can be seen. At a second end of the arm 122 an adapter 124 for supporting a filter grate is shown. The adapter 124 may be coupled to the arm 122 by an adhesive, a glue, a tape or any other coupling system disclosed in this document.

Figure 10A:
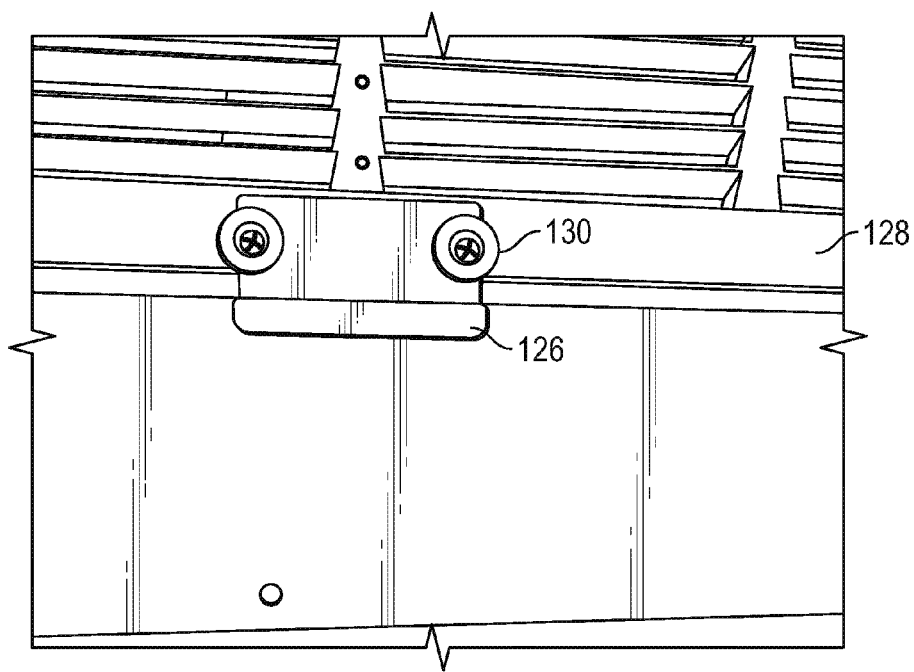
FIG. 10A is a front view of an implementation of a closure of an implementation of a filter grate support system.
Figure 10B:
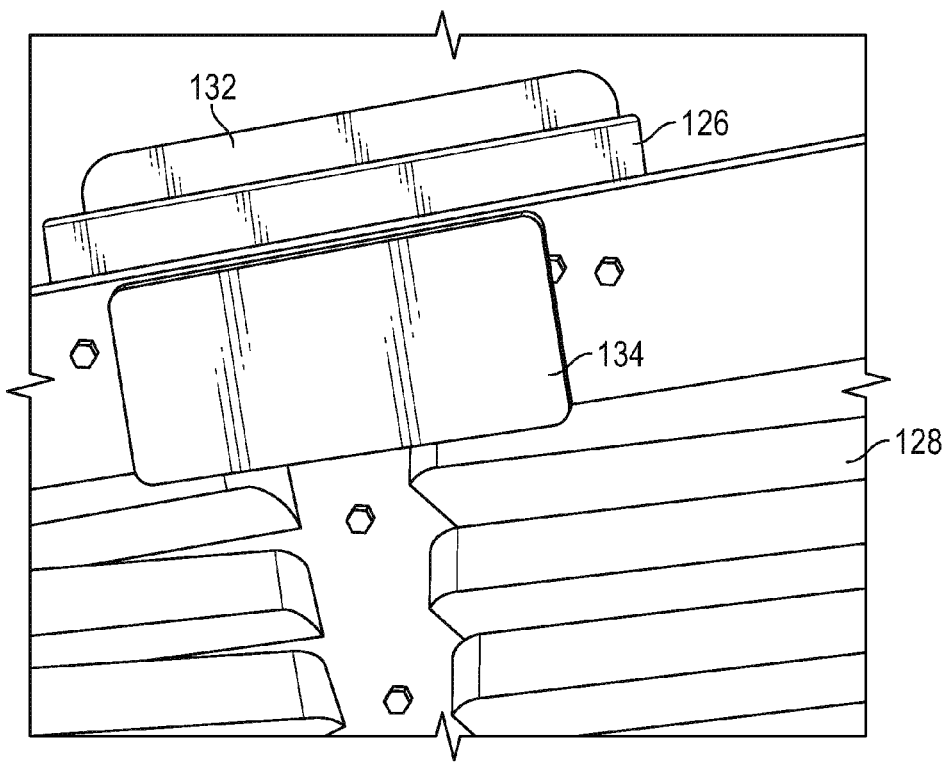
FIG. 10B is a back view of an implementation of a closure of an implementation of a filter grate support system.

Referring to FIG. 10A, a front view of an implementation of a closure 126 of an implementation of a filter grate support system is illustrated. The closure 126 may be coupled to a filter grate 128 by connectors 130. The connectors 130 may include, by non-limiting example, one or more screws and one or more washers. Referring to FIG. 10B, a back view of an implementation of a closure 126 of an implementation of a filter grate support system is illustrated. The closure 126 may include a bracket 132 and a magnet 134. The closure may be used to keep a filter grate 128 in a closed position.

In places where the description above refers to particular implementations of a filter holder, system for changing a filter and implementing components, sub-components, methods and sub-methods, it should be readily apparent that a number of modifications may be made without departing from the spirit thereof and that these implementations, implementing components, sub-components, methods and sub-methods may be applied to other filter holders and systems for changing a filter.

What is claimed is:

1. A filter holder comprising:
   a mounting bracket comprising two or more T-shaped brackets slidably coupled with each other, wherein each T-shaped bracket comprises a first part and a second part, the first part being substantially perpendicular to the second part;
   a disc, the disc comprising one or more holes therethrough, the one or more holes configured to receive one or more connectors coupled with the two or more T-shaped brackets;
   two or more clamps, each coupled to the second part of each of the two or more T-shaped brackets, the two or more clamps configured to couple to a filter;
   wherein the disc is slidably coupled to the first part of each of the two or more T-shaped brackets;
   wherein the second part of each of the one or more T-shaped brackets are substantially parallel with each other; and
   wherein the slidable coupling of the two or more T-shaped brackets allows the T-shaped brackets to accommodate a dimension of two or more differently sized filters.

2. The filter holder of claim 1, wherein the two or more T-shaped brackets are made of wire.

3. The filter holder of claim 1, wherein the first part of two or more T-shaped brackets is formed from a wire loop.

4. The filter holder of claim 1, wherein the disc is a ring comprising a central hole therethrough.

5. The filter holder of claim 1, wherein the disc is magnetizable.

6. The filter holder of claim 1, wherein the disc is a magnet.

7. The filter holder of claim 1, wherein the one or more connectors coupled with the two or more T-shaped brackets are two fasteners comprising two screws with two washers wherein the disc and the first part of the T-shaped brackets are slidably positioned in the space between the screws and the washers.

8. The filter holder of claim 1, where a magnet couples to the disc.

* * * * *